(12) United States Patent
Rosynsky et al.

(10) Patent No.: US 7,374,792 B2
(45) Date of Patent: May 20, 2008

(54) METHOD FOR APPLYING A CATALYST COMPOSITION TO THE INTERIOR OF A HOLLOW SUBSTRATE

(75) Inventors: Victor Rosynsky, Ewing Township, NJ (US); Kenneth W. Blamble, Martinsville, NJ (US); Brent C. Bibbee, Decatur, AL (US); Jerry D. Cornelius, Cullman, AL (US); Ralph A. Quigley, Madison, AL (US); Gary A. Gramiccioni, Madison, AL (US); Masaki Funabiki, Shizuoka (JP); Tunehisa Kawauchi, Tokyo (JP); Tomoya Takahashi, Shizuoka (JP)

(73) Assignee: BASF Catalysts LLC, Florham Park, NJ (US)

( * ) Notice: Subject to any disclaimer, the term of this patent is extended or adjusted under 35 U.S.C. 154(b) by 184 days.

(21) Appl. No.: 10/228,754

(22) Filed: Aug. 27, 2002

(65) Prior Publication Data

US 2003/0003232 A1 Jan. 2, 2003

Related U.S. Application Data

(62) Division of application No. 09/501,395, filed on Feb. 9, 2000, now Pat. No. 6,478,874.

(60) Provisional application No. 60/147,948, filed on Aug. 6, 1999.

(51) Int. Cl.
*B05D 7/22* (2006.01)
*B05D 3/12* (2006.01)
*B05C 7/04* (2006.01)
*B05C 3/00* (2006.01)

(52) U.S. Cl. ............... 427/231; 427/238; 427/294; 427/348; 427/372.2

(58) Field of Classification Search ................ 427/181, 427/238, 230, 294, 231, 295, 232, 348, 234, 427/340.1, 235, 350; 118/50, 63, 423, 400, 118/503
See application file for complete search history.

(56) References Cited

U.S. PATENT DOCUMENTS

| | | | |
|---|---|---|---|
| 3,331,787 A | 7/1967 | Keith et al. | 252/439 |
| 3,565,830 A | 2/1971 | Keith et al. | 252/466 |
| 3,948,213 A | 4/1976 | Hoyer et al. | 118/50 |

(Continued)

FOREIGN PATENT DOCUMENTS

WO    WO 97/48500 A1 * 12/1997

*Primary Examiner*—William Phillip Fletcher, III
(74) *Attorney, Agent, or Firm*—Melanie L. Brown; Scott S. Servilla; Diehl Servilla LLC

(57) ABSTRACT

A catalyst composition is applied to an interior of a hollow substrate. The composition is coated on the substrate by immersing the substrate into a vessel containing a bath of coating slurry. A vacuum is then applied to the partially immersed substrate. The intensity of the vacuum and its application time is sufficient to draw the coating slurry upwardly from the bath into each of a plurality of channels located in the interior of the hollow substrate. After removing the substrate from the bath it is rotated 180°. A blast of pressurized air is applied at an intensity and for a time sufficient to distribute the coating slurry within the channels of the substrate to form a uniform coating profile therein.

13 Claims, 6 Drawing Sheets

U.S. PATENT DOCUMENTS

| | | | |
|---|---|---|---|
| 3,959,520 A | 5/1976 | Hoyer et al. | 427/8 |
| 4,038,939 A * | 8/1977 | Hoyer et al. | 118/665 |
| 4,191,126 A | 3/1980 | Reed et al. | 118/50 |
| 4,384,014 A | 5/1983 | Young | 427/294 |
| 4,550,034 A | 10/1985 | Shimrock et al. | 427/243 |
| 4,609,563 A | 9/1986 | Shimrock et al. | 427/8 |
| 5,182,140 A * | 1/1993 | Watanabe et al. | 427/230 |
| 5,866,210 A | 2/1999 | Rosynsky et al. | 427/294 |

\* cited by examiner

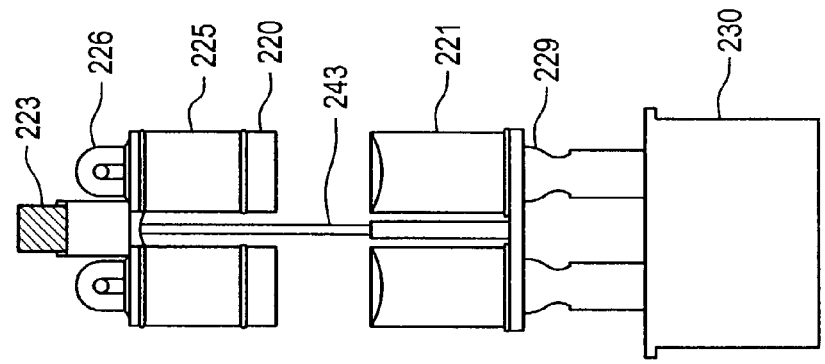
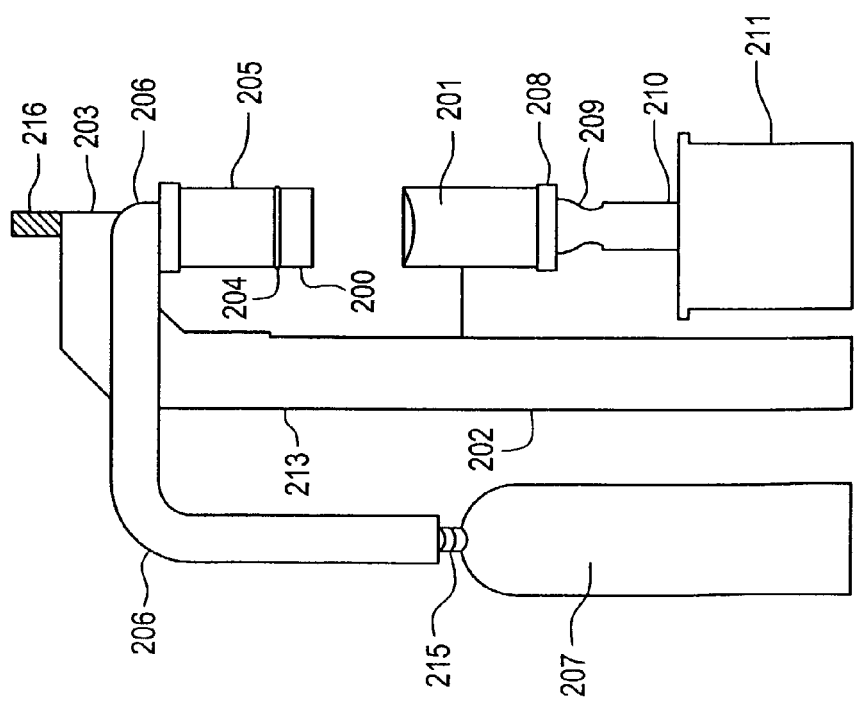

METHOD FOR APPLYING A CATALYST
COMPOSITION TO THE INTERIOR OF A
HOLLOW SUBSTRATE

This application is a divisional of application Ser. No. 09/501,395 filed Feb. 9, 2000 U.S. Pat. No. 6,478,874B1 issued on Nov. 12, 2002, which claims the benefit of Provisional Application No. 60/147,948 filed Aug. 6, 1999.

BACKGROUND OF THE INVENTION

1. Field of the Invention

The present invention relates to an apparatus and method for coating a substrate, and more particularly to an apparatus and method for impregnating monolithic substrates with a catalytic material.

2. Description of the Prior Art

Catalytic converters are well known for the removal and/or conversion of the harmful components of exhaust gases. Catalytic converters have a variety of constructions for this purpose. In one form the converter comprises the rigid skeletal monolithic substrate on which there is a catalytic coating. The monolith has a honeycomb-type structure which has a multiplicity of longitudinal channels, typically in parallel, to provide a catalytically coated body having a high surface area.

The rigid, monolithic substrate can be fabricated from ceramics and other materials. Such materials and their construction are described, for example, in U.S. Pat. Nos. 3,331,787 and 3,565,830 each of which is incorporated herein by reference. Alternatively, the monoliths can be fabricated from metal foil.

The monolithic substrate and particularly the multiplicity of channels can be coated with a slurry of a catalytic and/or absorbent material.

One method of coating a prefabricated monolithic substrate is to pump the catalyst slurry into the respective channels and then subject the coated substrate to a drying operation. Such systems have been unsuccessful in providing a uniform coating thickness and a uniform coating profile wherein the catalyst coating is deposited over the same length of each of the channels.

It has been proposed to employ a vacuum to draw the catalyst slurry upwardly through the channels. For example, Peter D. Young, U.S. Pat. No. 4,384,014 discloses the creation of a vacuum over the monolithic substrate to remove air from the channels and then drawing the catalyst slurry upwardly through the channels. The vacuum is then broken and excess slurry is removed, preferably by gravity drainage.

James R. Reed, et al., U.S. Pat. No. 4,191,126, discloses the dipping of the monolithic substrate into a slurry and then utilizing subatmospheric pressure to purge the excess coating slurry from the surfaces of the support. The applied vacuum is intended to unplug the channels so that the slurry is drawn over the surfaces of each of the channels.

An improvement in these systems is disclosed in Thomas Shimrock. et al., U.S. Pat. No. 4,609,563. This system encompasses a method of vacuum coating ceramic substrate members with a slurry of refractory and/or catalyst metal components wherein precisely controlled, predetermined amounts of the slurry are metered for application to the ceramic monolithic substrate. The monolithic substrate is lowered into a vessel, also known as a dip pan, of preferably predetermined dimensions to a predetermined depth containing the precise amount of slurry which is to be coated onto the substrate. The slurry is then drawn up by a vacuum which is applied to the end of the substrate opposite to the end which is immersed in the bath. No draining or purging of excess coating slurry from the substrate is necessary nor is any pre-vacuum application step required to eliminate air.

A further improved method is disclosed Victor Rosynsky et al, in U.S. Pat. No. 5,866,210 entitled, "METHOD FOR COATING A SUBSTRATE." There is disclosed a vacuum infusion method for coating monolithic substrates in which each of the channels comprising the substrate is coated with the same thickness of the coating and is characterized by a uniform coating profile wherein each channel of the substrate is coated over the same length. In particular, the method is directed to a vacuum infusion method for coating a substrate having a plurality of channels with a coating media comprising:

a) partially immersing the substrate into a vessel containing a bath of the coating media, said vessel containing an amount of coating media sufficient to coat the substrate to a desired level without reducing the level of the coating media within the vessel to below the level of the immersed substrate;

b) applying a vacuum to the partially immersed substrate at an intensity and a time sufficient to draw the coating media upwardly from the bath into each of the channels to form a uniform coating profile therein; and c) removing the substrate from the bath.

Optionally, after the coating media is applied to the substrate and as the substrate is being removed from the bath, a vacuum continues to be applied to the substrate at an intensity equal to or greater than the intensity of the vacuum imposed on the partially immersed substrate. After the vacuum is imposed, the substrate is inverted and coated from an opposite end producing two coatings having uniform coating profiles. This procedure is known to reduce the overlap of the coating media.

Overlap of the coating compound is particularly problematic to the automobile industry. The overlap area increases the delta pressure across the catalyst converter which adversely impacts engine performance and fuel consumption and increases the engine's wear. Equally problematic is where the coating compound has a gap in the middle which results from incomplete coverage during the coating procedure. This, too, may adversely affect converter and engine performance. However, where the substrate is inverted in order to coat both ends, it is extremely difficult to ensure that the coating materials will not overlap or gap to some extent. Even the smallest amount of overlap or gap negatively affects catalytic performance.

It would therefore be a significant benefit in the art of coating monolithic substrates and particularly monolithic substrates for use in catalytic converters if each channel can be coated with the same thickness of coating for the same length without any overlap or gap in the coating materials.

SUMMARY OF THE INVENTION

The present invention provides a system for applying a catalyst composition to an interior of a hollow substrate which eliminates the overlap or gap of the coating slurry. Generally stated, the system comprises coating a substrate with a catalyst composition by immersing the substrate into a vessel containing a bath of coating slurry and applying a vacuum to the partially immersed substrate at an intensity and time sufficient to draw the coating slurry upwardly from the bath into each of a plurality of channels located in the interior of the hollow substrate; removing the substrate from the bath: rotating the substrate 180°; and applying a blast of pressurized air to the substrate at an intensity and time sufficient to distribute the coating slurry within the channels of the substrate to form a uniform coating profile therein.

The term "uniform coating profile" as used herein means that each channel of the substrate will be coated over the same length. Advantageously, the present invention provides a system whereby the overlap or gap of the catalytic composition on the substrate is completely eliminated. This provides distinct advantages for catalytic converters. First, less precious metal may be used because the catalytic composition is evenly distributed throughout the substrate. Second, there is more precise control over the placement of the catalyst which is particularly advantageous when using multiple catalyst coating compositions. Third, by virtue of removing the overlap or gap, the thickness of the coating can be more precisely controlled, particularly in multi coating applications. Resistance to the flow of gases to be treated through the substrate is thereby reduced, resulting in better control over and less severe pressure drops through the channels. When such substrates are used as catalytic converters, engine performance is not diminished. As used herein the term "vacuum infusion" shall generally mean the imposition of a vacuum to infuse a coating slurry into a plurality of channels within a monolithic substrate.

In another aspect of the present invention there is provided a method for applying a catalyst composition to the interior of a hollow substrate comprising coating the interior of a hollow substrate with a predetermined amount of a catalytic composition; rotating the substrate 180°; and applying a blast of air to the substrate to distribute the catalytic composition therewithin. Catalytic converters produced in accordance with the present invention exhibit less wet gain and precious metal variability, resulting in increased production output and less expense incurred from the use of precious metals. Advantageously, automobiles using these materials have reduced fuel consumption because there is much lower pressure drop across the catalyst, than is seen with catalytic converters having an overlap or gap of the catalytic composition.

The present invention also provides an apparatus for coating a substrate with a catalytic composition. The apparatus comprises a coating station comprising a dip pan containing a continuous supply of a coating slurry, a vacuum cone operatively engaged to apply a vacuum to the substrate, an inflatable bladder clamp for supporting and rotating the substrate and an air blast station for supplying a blast of pressurized air to the substrate. The apparatus may further comprise a movable platform for moving the substrate between stations and a robot for automatically loading and unloading the substrate onto and off of the apparatus. Advantageously, the apparatus is highly automated and efficient, making it less expensive and more reliable to use than prior art apparatus.

BRIEF DESCRIPTION OF THE DRAWINGS

The invention will be more fully understood and further advantages will become apparent when reference is had to the following detailed description and the accompanying drawings, in which:

FIG. 5 is a side elevation view of an air blast station in accordance with the present invention;

FIG. 6 is a front elevation view of an air blast station adapted to accommodate two monolithic substrates:

DETAILED DESCRIPTION OF THE INVENTION

The present invention is directed to an improved system for coating a catalytic composition onto a substrate whereby the catalytic composition is uniformly coated within the interior surface of the substrate. The system of the present invention combines vacuum infusion coating with an air blast apparatus to provide a uniformly coated substrate without gaps or overlap of the catalytic composition within the interior of the substrate. As a consequence of the present invention, production output is increased and less precious metal is required in the catalytic composition, making a higher quality catalysts less expensive to produce. Moreover, automobiles using the catalysts of the present invention exhibit reduced fuel consumption, making these materials much more attractive to the automobile industry.

More specifically, the system of the present invention comprises coating a substrate with a catalyst composition by immersing the substrate into a vessel containing a bath of coating slurry and applying a vacuum to the partially immersed substrate at an intensity and time sufficient to draw the coating slurry upwardly from the bath into each of a plurality of channels located in the interior of the hollow substrate; removing the substrate from the bath; rotating the substrate 180°; and applying a blast of pressurized air to the substrate at an intensity and time sufficient to distribute the coating slurry within the channels of the substrate to form a uniform coating profile therein.

Figure 1:
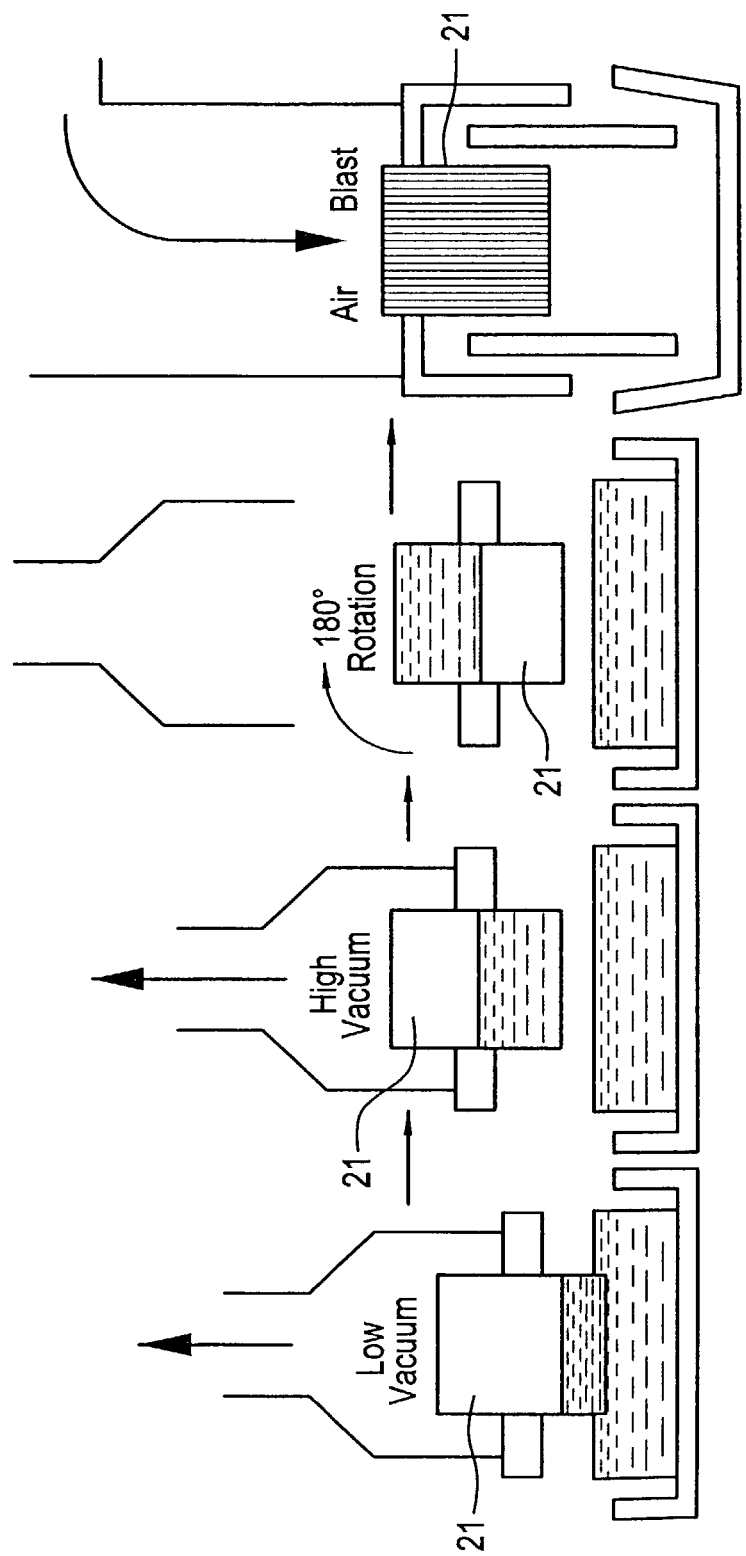
FIG. 1 is a schematic flow diagram of the system illustrating the application of a low and high intensity vacuum to a substrate, 180° rotation of the substrate, and the application of an air blast.

Referring to FIG. 1 of the drawings, there is shown a schematic diagram of a system embodying the principles of the present invention. Generally stated, a monolithic substrate 21 is immersed in a catalytic composition, a low intensity vacuum applied, the substrate is removed from the coating slurry, and a higher intensity vacuum applied. Thereafter, the substrate is rotated 180° and an air blast is applied. This is accomplished by a coating station and an air blast station which may simultaneously coat one, two, or more substrates. The system may be designed to allow a human operator to manually move the substrate between stations, or, alternatively, with a moveable platform which advances the substrate between stations (discussed in more detail below). In this instance, an electrical motor drives the moveable platform.

The process of providing the coated catalytic substrate is briefly described as follows: The operator defines system parameters (i.e., depth of immersion of the substrate in the coating slurry, duration and intensity of the vacuum and air blast, length of time at each indexing station. etc.), adjusts the system to conform with the specified parameters and presses a start button on a control panel (not shown). A robot or human operator picks up a hollow substrate which is open at both ends and transfers this to a bladder clamp which inflates to seal the periphery of substrate and hold the substrate in place. The bladder clamp is connected to a platform which serves to move the substrate between different stations within the system. Where a human operator moves the substrate between the stations, each of the different stations has its own bladder clamp to secure the substrate. Assuming that a movable platform is used, the platform advances the inflated bladder clamp to the coating station where the dip pan moves upward to a predetermined height causing the substrate to immerse to a given depth. A low vacuum is applied to draw a slurry up through the interior of the substrate from the dip pan. The substrate is then lifted out of the dip pan, a high vacuum applied, and the substrate rotated 180°. At this point, the substrate and the platform advances to an air blast station where the upper and receiving hood of the air blast station close around the substrate, and a blast of air is applied to the substrate to distribute the coating slurry about the uncoated portions of the substrate. After the air blast, the upper and receiving hoods of the air blast station open and the bladder clamp and the platform advances to a loading/unloading station where the bladder clamp deflates and the substrate is removed from the system.

Figure 2:
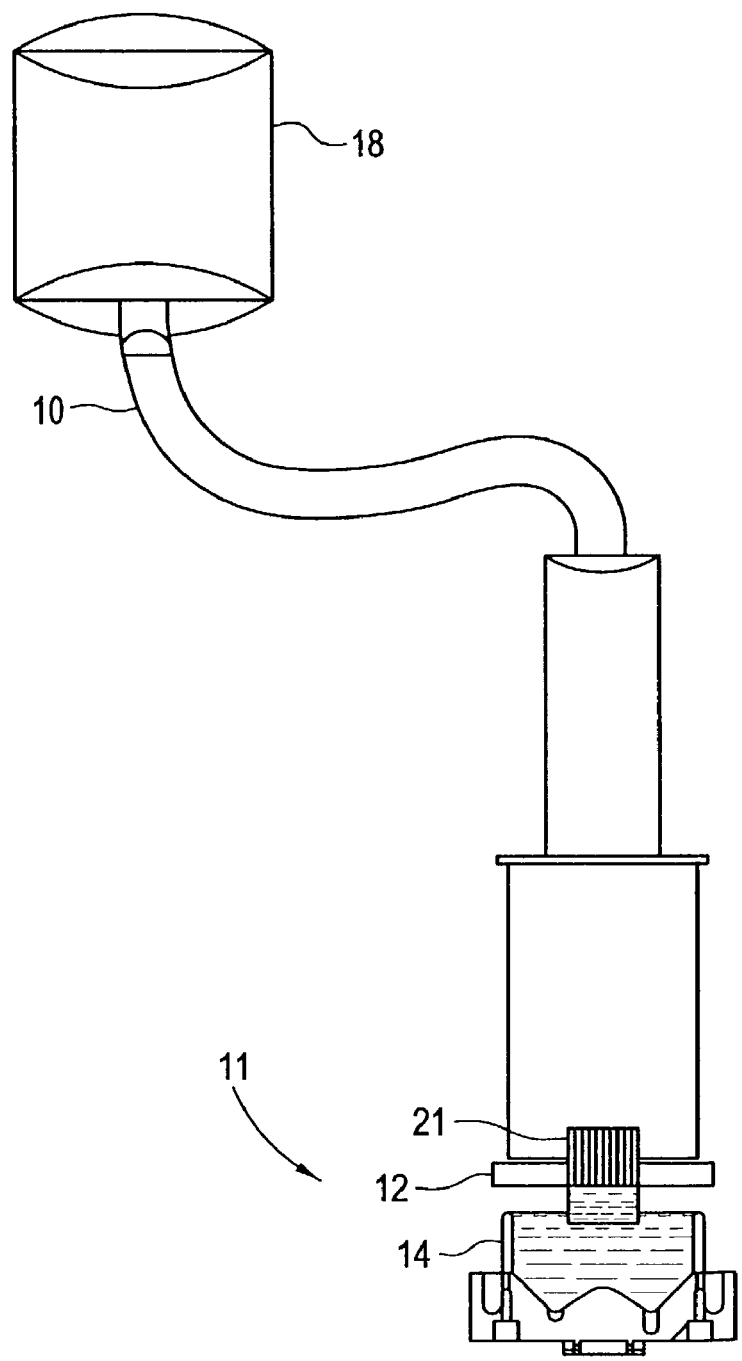
FIG. 2 is a side elevation view illustrating the coating station with the vacuum hood lowered about a substrate immersed in the dip pan.

While the overall system is generally illustrated in FIG. 1, it can be better understood by referring to a number of stations which make up the entire system. Of course, each of these stations may be adapted with computerized controls to provide for automatic action once the system is initially programmed by an operator. A suitable apparatus for coating substrates in accordance with the present invention is manufactured by MPT Technologies Inc. of Brecksville, Ohio. Turning now to FIG. 2, there is shown a perspective view of a coating station utilized by the present invention. Generally stated, coating station 11 comprises a vacuum which is supplied via vacuum pump 18 through a line 10 to a vacuum hood 12 which is operatively connected to the substrate when the substrate in placed in contact with the coating slurry. A dip pan 14 holds continuously circulating coating slurry received from a storage tank for coating the substrate. In accordance with the present invention, an inlet tube provides for the continuous flow of coating slurry from a slurry tank (not shown) to the dip pan 14. An outlet tube provides for the continuous flow of coating slurry out of the dip pan to a slurry recovery tank (not shown). In this way, the coating slurry may be recovered and recycled back into the dip pan 14 thereby reducing the cost associated with furnishing fresh coating slurry into the system. A series of valves may be located on the inlet and outlet tubes to regulate the slurry flow. The coating slurry need not be metered to provide an exact amount of coating slurry to the dip pan 14. Instead, a continuous flow of coating slurry is provided to the dip pan 14. Preferably, the dip pan 14 is configured with a U-shaped receptacle which is contiguous with the circumference of the dip pan 14 and functions to catch and direct any slurry overflow to the outlet tube. The dip pan 14 is operatively connected to a carriage driven by a servo motor which functions to raise and lower the dip pan 14 along the vertical axis to immerse the substrate 21 therein or remove it therefrom. A computer controls the vertical movement of the dip pan 14 to control the depth of immersion of the substrate 21 in the coating slurry to insure an adequate volume 22 of the coating slurry is supplied to the dip pan to coat the end of the substrate 21 immersed therein. The volume of coating slurry required to coat the substrate 21 in accordance with the present invention is based upon a variety of factors well known in the art including volume of the substrate, required slurry loading, viscosity of the slurry, etc.

Figure 3:
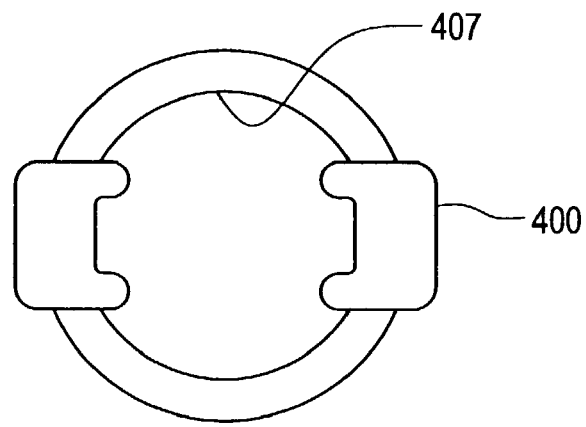
FIG. 3 is a top view of an inflatable bladder clamp in accordance with the present invention.

The dimensions and shape of the dip pan 14 may be varied over a wide range. A single size and shape dip pan may be used to coat a wide variety of different size and shape monolithic substrates. Thus, the dip pan 14 is capable of accommodating a rectangular substrate as well as oval, polygon, and circular substrates which may be used from time to time for special applications.

Where the apparatus utilizes a platform to advance the substrate between stations, the apparatus may further comprise a loading/unloading station. As is shown in FIG. 3, the loading/unloading station consists of a bladder clamp 400 which has a larger circumference than the substrate. The bladder clamp 400 is equipped with an air supply inlet (not shown) which enables the bladder to inflate so that the interior 407 sealingly engages the outside perimeter of a substrate. The bladder clamp 400 is also equipped with an air supply outlet that allows the bladder to deflate when necessary. Preferably, the air supply inlet and outlet are the same. Each of these inlets and outlets may be computer control led to permit automatic inflation and deflation of bladder clamp 400. Bladder clamp 400 is permanently affixed to the moveable platform by suitable means such as screws, pins, clamps, or the like. The bladder clamp 400 serves to move the substrate between the different stations of the apparatus. It is contemplated that any shape and type of bladder clamp may be used so long as it accommodates the shape of the substrate. By use of a bladder clamp, the apparatus can coat any substrate, regardless of shape of size. Of course, the apparatus need not utilize a robot and the associated loading/unloading station. Instead, a human operator can manually move the substrate between the different stations. In an alternative embodiment, the loading and unloading stations may be separate, each having the inflatable bladder clamp described above.

The bladder clamp is also connected to a rotational device which serves to rotate the substrate 180°. Any rotational device may be used, however, a pneumatically actuated rotational device is preferred. One such example of a preferred rotational device is manufactured by Shunk Corp. of Germany.

Figure 4:
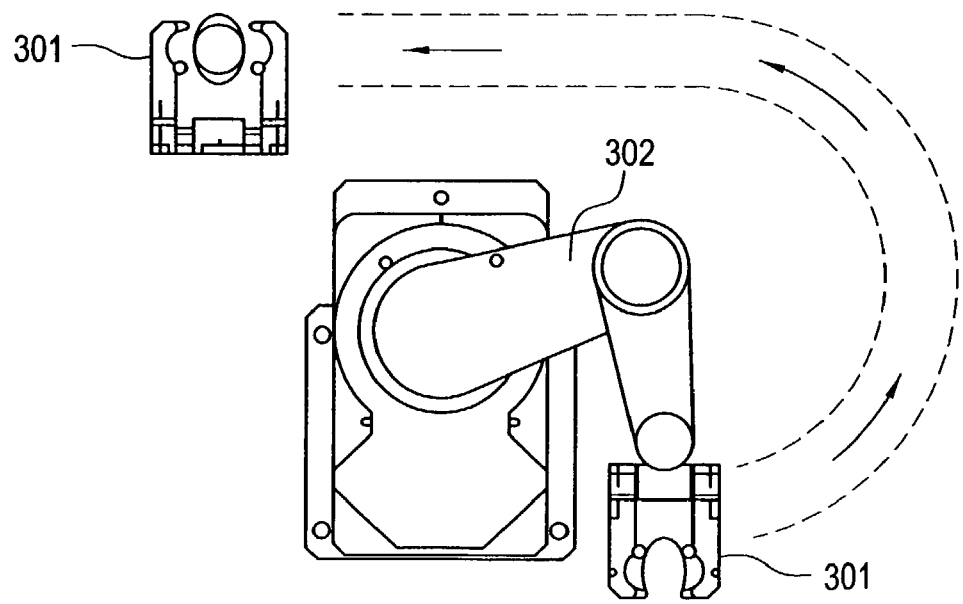
FIG. 4 is a top view of a robotic arm for loading and unloading a substrate.

A robot may be used to load and unload the substrate to and from the apparatus. FIG. 4 illustrates a top view of a robotic arm which may be used in the present invention. Any type of robotic apparatus which is designed to move objects may be used. A particularly suitable robot is sold by Adept Corp. of Cincinnati, Ohio. As can be seen, the robot 300 is capable of grasping the substrate and thereby move it via movable arm 302 to and from the apparatus. While robot 300 is shown adapted with pinchers 301, any end unit suitable for grasping substrates used for catalytic converters may be used. Robot 300 may also be adapted with a vision system which allows robot 300 to properly orient the substrate in the loading station. Robot 300 may also be used to remove the coated substrate from the apparatus. That is, once the substrate has been coated and subjected to an air blast, the moveable platform advances to the load/unload station where the robot 300 grasps the coated substrate from the bladder clamp 400.

Referring to FIG. 5 of the drawings, there is shown a side elevation view of the air blast station utilized in the system of the present invention. A suitable unit for performing the air blast in accordance with the present invention is manufactured by MPT Technologies Inc. of Brecksville, Ohio. The air blast station generally includes upper hood 200, receiving hood 201, air supply 207, and stationary frame structure 213. Air blast feed 205 is connected to the top 204 of upper hood 200 on one end and serves to provide a source of pressurized air to upper hood 200. The top of air blast feed 205 is threadingly engaged with line 206. The top 204 of upper hood 200 is also connected to carriage 203 for movement along rod 216 on the vertical or Z axis. Carriage 203, is in turn, coupled to stationary frame structure 213. A servo motor (not shown) appropriately drives carriage 203 up and down along the vertical axis which operate to open and close upper hood 200 and attached air blast feed 205. Line 206, which may be made of any suitable material to carry pressurized air, runs between the air blast feed 205 and air supply 207.

Receiving hood 201 is adapted to receive the substrate. Slurry discharge tube 209 extends from an aperture 208 positioned at the bottom of receiving hood 201. On the opposite end, slurry discharge tube 209 is coupled to an aperture 210 positioned on the top of slurry recovery tank 211. Slurry recovery tank 211 may be connected to slurry tank 34 of the coating station via piping and an optional servo motor connected to the system to drive the used catalytic composition from slurry recovery tank 211 to recovery tank 34 for reuse in the system. Receiving hood 201 is coupled to a carriage (not shown) which provides for movement of receiving hood 201 in the vertical or Z direction when driven by a servo motor to open and close the receiving hood. In the closed position, upper hood 200 sealingly engages one side of bladder clamp 400 and the receiving hood 201 sealingly engage with the other side of bladder clamp 400 to form a seal which can contain, as discussed below, filled with pressurized air from air supply 207. In the open position, upper hood 200 is sufficiently distanced from receiving hood 201 to allow for loading or unloading of the substrate.

Air supply 207 is contained within a tank, typically made of metal, plastic or other material suitable to hold pressurized air. The tank may be refillable, that is, it may be exchanged for a new tank when the contents have been used, or it may be connected to another air supply which provides the air for refill in air supply 207. An adjustable regulator (not shown) is attached to the air blast station shown in FIG. 5 in order to adjust the pressure in air supply 207. As previously mentioned, line 206 connects air supply 207 with air blast feed 205, and thereby provides a passageway for air to travel from air supply 207 to upper hood 200. A normally open feed valve 215 is suitably mounted on air supply 207 and operates on line 206 to regulate the flow of air into air blast feed 205. Thus, when a substrate is placed on receiving hood 201 and upper hood 200 is closed to sealingly engage receiving hood 201, air supply 207 provides a regulated air supply via valve 215 and line 206 to air blast feed 205 which, in turn, provides a pressurized air to the cavity formed when upper hood 200 is in the closed position. This pressurized blast of air serves to uniformly distribute the coating material throughout in the interior of the substrate and "blow off" the excess. The excess coating slurry enters slurry recovery tank 211 by way of gravity feed from slurry discharge tube 209 via aperture 210.

FIG. 6 illustrates a front elevational view of an air blast station in accordance with the present invention adapted to simultaneously receive and provide a blast of air to two coated substrates. In this illustration, an upper hood is represented by 220, receiving hood by 221, stationary frame structure by 243, and air blast feed and its associated carriage as 225 and 223, respectively. Line 226 connects air blast feed 225 to the air supply (not shown). Excess coating slurry, which has been "blown off" the substrate after the air blast is captured by slurry recovery tank 230 via slurry discharge tube 229.

Figure 7:
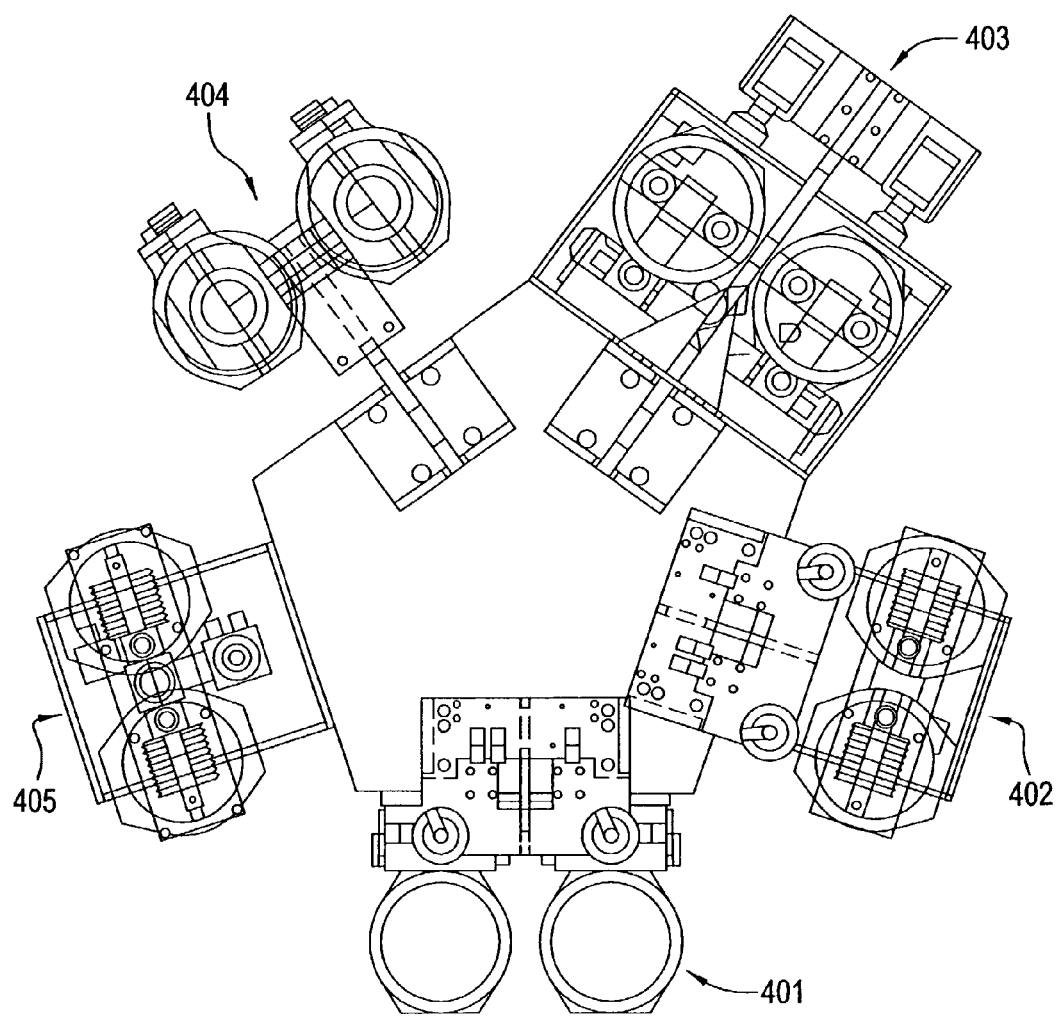
FIG. 7 is a top view showing a five-station system including two weigh stations; one interposed between the loading/unloading station and the coating station, the other interposed between the air blast station and the loading/unloading.
Figure 8:
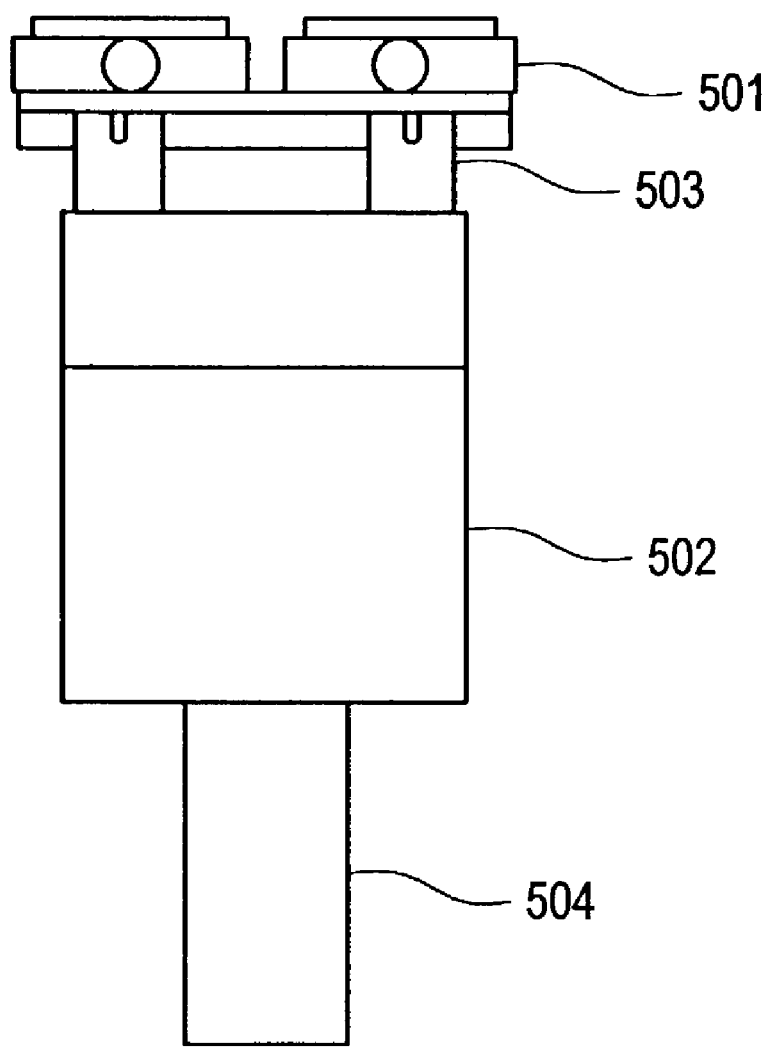
FIG. 8 is a side elevation view of a weigh station in accordance with the present invention.

The apparatus may also be equipped with weighing stations for weighing the substrate before coating and after the air blast. By weighing the substrate before and after coating, the percentage of wet gain variability, that is the uniformity of the coating process, can be determined. FIG. 7 provides a top view of a five-station automatic apparatus in accordance with the present invention with loading/unloading station 401, weigh station 402, coating station 403, air blast station 404, and weigh station 405. FIG. 8 illustrates a weigh station used for simultaneous weighing of two substrates in accordance with the present invention. Generally stated, the weigh station is configured so that when the moveable platform advances to the station, the bladder clamp deflates. Below the platform is positioned a unit containing scale 501 and a servo motor 502 supported by stationary frame 504 which operates via rod 503 to raise and lower the scale in a vertical direction along the Y axis. When scale 501 is raised upward, it touches the bottom of the substrate, enabling weighing of the uncoated or coated substrate. After performing weight calculations, scale 501 lowers along rod 503. Where weight calculations are performed prior to coating, the substrate is made to rest on the weigh platform which acts as a register platform to determine the vertical location of the substrate. Advantageously, the vertical location of the substrate as calculated at the weigh station may be used in the coating station to determine the depth of immersion of the substrate into the slurry. The weigh station is connected to an electronic means which records the weight of the substrates. As with the other stations described herein, the weigh station may be adapted with at least one computer to perform any of the foregoing functions.

In accordance with the method aspect of the present invention, as described above, a human operator programs system parameters into a computer prior to commencing operation. Once programmed, the system automatically continues the coating process until operations are terminated or redefined by the operator. A robot or a human operator manually places the uncoated substrate in the loading/unloading station 13 where bladder clamp 400 inflates to hold the substrate securely in place, and the moveable platform advances the substrate to the coating station 11.

The coating procedure used in the present invention is broadly described by Victor Rosynsky et al., U.S. Pat. No. 5,866,210, which is expressly incorporated herein by reference. This procedure is modified in the present invention as described below. When the substrate advances to the coating station, dip pan 14, which contains a continuous supply of coating slurry, raises to contact the underside of the inflated bladder clamp in accordance with a prescribed depth. As previously indicated, this is determined based upon a variety of factors such as volume of the substrate, required slurry loading, and viscosity of slurry, etc. The vacuum hood moves downward to sealingly engage one side of the bladder clamp and the raised dip pan sealingly engages the other side of the bladder clamp. In this way, a sealed cavity is formed.

When the substrate is placed into the coating slurry, the coating slurry is drawn upwardly into the interior channels through capillary action even without the imposition of a vacuum. Because there is sufficient volume of the coating slurry above the immersed end of the substrate, capillary action is uniformly provided to all of the channels. As a result, a uniform coating profile can be initially obtained even in the absence of a vacuum. Nevertheless, it is necessary to impose a low intensity vacuum to further draw the coating slurry upwardly.

The low intensity vacuum should be maintained at no more than about 1 inch of water. If the vacuum exceeds this level, the consistency of the length and thickness of the coating may be compromised. The time the low intensity vacuum is applied will vary depending on the consistency and density of the coating slurry and the length the channels to be coated. In most cases, the low intensity vacuum will be applied for from about 1 to 3 seconds. Advantageously, the seal between the substrate periphery and the interior of the bladder clamp enhances the movement and overall uniformity of the coating slurry in the channels. As previously indicated, a second vacuum operation of the same or higher intensity (i.e., greater than 1 inch of water, typically from about 5 to 15 inches of water) can be applied after the vacuum hood is raised and the substrate has been removed from the coating slurry. The duration of the second vacuum operation is typically from about 2 to 4 seconds. In most cases the vacuum operation(s) (i.e., the sum of the first and second vacuum operations) will last for no more than a total time of about 5 seconds. The substrate is then rotated 180° in the bladder clamp and indexed to the air blast station 12.

When the platform reaches the air blast station 12, upper hood 200 is lowered and receiving hood 201 raised to sealingly engaged with upper hood 200 to form a cavity in which the substrate is positioned. A blast of air, typically pressurized between about 20 to about 50 psi is delivered to the substrate via line 206. The duration of the air blast ranges from about 0.3 to about 0.5 seconds, and is typically about 0.3 seconds. After the air blast, upper hood 200 is raised, the lower hood lowers, and the platform advances to the load/unload station where bladder clamp 400 deflates and a robot or human operator removes the substrate. As previously discussed, weigh stations may be interposed before the coating station and after the air blast station.

Any monolithic substrate can be coated in accordance with the present invention. Such substrates are comprised of fine, parallel gas flow extending therethrough form an inlet face to an outlet face of the substrate so that the channels are open to air flow entering from the front and passing through the substrate and out the rear. Preferably, the channels are essentially straight from their inlet to their outlet and are defined by walls in which a coating slurry is coated as a wash coat so that the gases flowing through the channels contact the coating slurry. The flow channels are thin wall channels which can be of any suitable cross-sectional shape and size such as trapezoidal, rectangular, square, sinusoidal, hexagonal, oval, circular or formed from metallic components which are corrugated and flat as are known in the art. Such structures may contain from about 60 to 1200 or more gas inlet openings ("cells") per square inch of cross section. Such structures are disclosed for example in U.S. Pat. Nos. 3,904,551; 4,329,162; and 4,559,193, each of which are expressly incorporated herein by reference.

Coating slurry which may be coated in accordance with the present invention can vary widely and include, but are not limited to catalyst compositions, absorbent compositions and combinations thereof customarily used for the production of catalytic converters. Multiple coats of different compositions may also be used. Suitable coating slurry compositions are as disclosed for example in U.S. Pat. Nos. 5,057,483; 4,714,694; and 4,134,860, each of which is expressly incorporated herein by reference.

After the substrate has been removed from the system it may be dried before the substrate is sent to a heating section where the coating is cured. Drying of the coated substrate can be conducted in any suitable manner which may be facilitated by the imposition of a vacuum. A particularly suitable drying process is described in copending application U.S. Ser. No. 09/067,831 filed Apr. 28, 1998, entitled "Method for Drying a Coated Substrate," attorney docket number 3924, the contents of which are expressly incorporated herein by reference.

In accordance with the present invention, a substrate may be coated within about 5 to about 10 seconds, even where weigh stations are employed. The amount of dwell time at a single station can vary, and will depend upon coating type, coating thickness, and the like. With a 10-second cycle, single and double coating apparatus may thus coat approximately 360 substrates/hour and 720 substrates/hour, respectively. Likewise, a 5-second cycle will enable the coating of 1420 substrates/hour, making the method extremely efficient. The substrates are uniformly coated, without any of the gaps or overlay present in the prior art methods which require that when opposite ends of the substrate are dipped in the coating slurry. Moreover, substrates coated in accordance with the present invention exhibit lower wet gain and precious metal variability, which demonstrates the reliability and the relatively lower expense of the present invention. For example, prior to the present invention, the wet gain variability between coated substrates was approximately 10-15%. Substrates produced in accordance with the method described herein, by contrast, evidence only about 2.6% wet gain variability. Similarly, prior to the present invention, the total precious metal gradient within a substrate was about 10-20%, while substrates produced as described herein exhibit less than 5% precious metal gradient. As such, precious metal is evenly distributed throughout the substrate, thereby providing controlled precious metal loading.

Having thus described in invention in rather full detail, it will be recognized that such detail need not be strictly adhered to but that various changes and modifications may suggest themselves to one skilled in the art, all falling within the scope of the invention, as defined by the subjoined claims.

The invention claimed is:

1. A method for applying a catalyst composition to an interior of a hollow substrate comprising:
    coating a substrate with a catalyst composition by partially immersing an end of the substrate into a vessel containing a bath of coating slurry and applying a vacuum to the partially immersed substrate at an intensity and time sufficient to draw the coating slurry upwardly from the bath into each of a plurality of channels located in the interior of the hollow substrate;
    removing the substrate from the bath;
    rotating the substrate 180°; and
    then applying a blast of pressurized air to the end of the substrate which had been immersed into the slurry at an intensity and time sufficient to distribute the coating slurry within the channels of the substrate to form a uniform coating profile therein.

2. A method as recited in claim 1, wherein after the substrate has been removed from the bath, a vacuum is applied to the substrate.

3. A method as recited in claim 2, wherein the intensity of the vacuum applied after the substrate has been removed from the bath is at least equal to the intensity of the vacuum applied to the substrate while immersed in the bath.

4. A method as recited in claim 1, wherein the air blast is applied at an air blast station which comprises an upper hood, a receiving hood and an air supply operatively connected to the upper hood.

5. A method as recited in claim 1, wherein the duration of the air blast ranges from about 0.3 to about 0.5 seconds.

6. A method as recited in claim 1, wherein the air blast is pressurized between about 20 to about 50 psi.

7. A method for applying a catalyst composition to the interior of a hollow substrate comprising:

coating the interior of a hollow substrate with a catalytic composition by partially immersing an end the substrate into a vessel containing a bath of coating slurry and applying a vacuum to the partially immersed substrate at an intensity and time sufficient to draw the coating slurry upwardly from the bath into the interior of the hollow substrate;

removing the substrate from the bath;

rotating the substrate 180°; and then applying a blast of air to the end of the substrate which had been immersed into the slurry to distribute the catalytic composition therewithin.

8. A method as recited in claim 7, further comprising loading the substrate into an inflatable bladder clamp.

9. A method as recited in claim 8, wherein the substrate is loaded into the inflatable bladder clamp by a robot.

10. A method as recited in claim 7, further comprising drying the substrate.

11. A method as recited in claim 7, wherein the air blast is supplied for a duration ranging from about 0.3 to about 0.5 seconds.

12. A method as recited in claim 7, further comprising weighing the substrate.

13. A method as recited in claim 7, wherein the air blast is pressurized between about 20 to about 50 psi.

* * * * *